(12) United States Patent
Kirazci et al.

(10) Patent No.: US 9,378,304 B2
(45) Date of Patent: Jun. 28, 2016

(54) SEARCHABLE, MUTABLE DATA STRUCTURE

(71) Applicant: Google Inc., Mountain View, CA (US)

(72) Inventors: Ulas Kirazci, Mountain View, CA (US); Justin Foutts, San Mateo, CA (US)

(73) Assignee: Google Inc., Mountain View, CA (US)

( * ) Notice: Subject to any disclaimer, the term of this patent is extended or adjusted under 35 U.S.C. 154(b) by 86 days.

(21) Appl. No.: 13/972,501

(22) Filed: Aug. 21, 2013

(65) Prior Publication Data

US 2014/0201247 A1 Jul. 17, 2014

Related U.S. Application Data

(60) Provisional application No. 61/753,150, filed on Jan. 16, 2013.

(51) Int. Cl.
*G06F 17/30* (2006.01)

(52) U.S. Cl.
CPC .... *G06F 17/30961* (2013.01); *G06F 17/30292* (2013.01); *G06F 17/30625* (2013.01)

(58) Field of Classification Search
CPC .............. G06F 17/30292; G06F 17/30961; G06F 17/30625
USPC .......................................................... 707/803
See application file for complete search history.

(56) References Cited

U.S. PATENT DOCUMENTS

| 6,115,716 | A * | 9/2000 | Tikkanen .......... G06F 17/30982 |
| 6,460,112 | B1 * | 10/2002 | Srinivasan et al. ............ 711/108 |
| 6,505,206 | B1 * | 1/2003 | Tikkanen et al. ............. 707/797 |
| 6,560,610 | B1 * | 5/2003 | Eatherton et al. |
| 6,675,169 | B1 * | 1/2004 | Bennett et al. |
| 8,156,156 | B2 * | 4/2012 | Ferragina et al. ............. 707/803 |
| 2004/0122836 | A1 * | 6/2004 | Bennett et al. ................ 707/100 |
| 2005/0157712 | A1 * | 7/2005 | Rangarajan et al. .......... 370/388 |

(Continued)

FOREIGN PATENT DOCUMENTS

| EP | 1434148 B1 | 2/2013 |
| WO | WO03079618 A2 | 9/2003 |
| WO | WO2008119242 A1 | 10/2008 |

OTHER PUBLICATIONS

Morita, Kazuhiro, et al., "Fast and compact updating algorithms of a double-array structure", Information Sciences, vol. 159, Elsevier, © 2004, pp. 53-67.*

(Continued)

*Primary Examiner* — Robert Stevens
(74) *Attorney, Agent, or Firm* — Fish & Richardson P.C.

(57) ABSTRACT

A data structure includes three arrays. A first array includes a root node, one or more intermediate nodes, and one or more leaf nodes. A second array includes one or more slices, each of which includes one or more elements; a third array also includes one or more elements. Each root node and intermediate node in the first array points to a respective slice in the second array. Each element in the second array stores a byte and has an associated pointer that points either to a respective intermediate node or to a respective leaf node in the first array. Each leaf node in the first array points to a respective element in the third array, and each element in the third array stores a respective sub-string of bytes. The trie can be particularly advantageous, for example, in applications on resource-constrained computing devices, such as mobile phones, tablets, and other hand-held computing devices.

20 Claims, 10 Drawing Sheets

(56) References Cited

U.S. PATENT DOCUMENTS

| | | | | |
|---|---|---|---|---|
| 2007/0094313 | A1* | 4/2007 | Bolotin | 707/205 |
| 2008/0181139 | A1* | 7/2008 | Rangarajan et al. | 370/256 |
| 2011/0246503 | A1* | 10/2011 | Bender et al. | 707/769 |
| 2012/0170580 | A1* | 7/2012 | Jagannathan et al. | 370/392 |
| 2013/0179419 | A1 | 7/2013 | Hsu | |
| 2013/0294450 | A1* | 11/2013 | Wang et al. | 370/392 |
| 2014/0297985 | A1* | 10/2014 | Graefe et al. | 711/165 |

OTHER PUBLICATIONS

Dorji, Tshering C., et al., "New methods for compression of MP double array by compact management of suffixes", Information Processing and Management, vol. 46, Elsevier, © 2010, pp. 502-513.*

Aoe, Jun-ichi, et al., "A Trie Compaction Algorithm for a Large Set of Keys", IEEE Transactions on Knowledge and Data Engineering, vol. 8, No. 3, Jun. 1996, pp. 476-491.*

Srinivasan, V., et al., "Fast Address Lookups Using Controlled Prefix Expansion", ACM Transactions on Computer Systems, vol. 17, No. 1, Feb. 1999, pp. 1-40.*

Yata, Susumu, et al., "A compact static double-array keeping character codes", Information Processing and Management, vol. 43, Elsevier, © 2007, pp. 237-247.*

Grossi, Roberto, et al., "Compressed Suffix Arrays and Suffix Trees with Applications to Text Indexing and String Matching", STOC 2000, Portland, OR, © 2000 ACM, pp. 397-406.*

Yata, Susumu, et al., "An efficient deletion method for a minimal prefix double array", Software—Practice and Experience, vol. 37, John Wiley & Sons, Ltd., © 2006, pp. 523-534.*

Aoe, Jun-ichi, et al., "An Efficient Implementation of Trie Structures", AUTO '93, Software—Practice and Experience, vol. 9, John Wiley & Sons, Ltd., © 1992, pp. 695-721.*

Cooper, Brian F., et al., "A Fast Index for Semistructured Data", Proc. of the 27th VLDB Conf., Rome, Italy, © 2001, pp. 341-350.*

Ferragina, Paolo, et al., "A Fully-Dynamic Data Structure for External Substring Search", STOC '95, Las Vegas, NV, pp. 693-702.*

Heinz, Steffen, et al., "Burst Tries: A Fast, Efficient Data Structure for String Keys", ACM Transactions on Information Systems, vol. 20, Issue 2, Apr. 2002, pp. 192-223.*

Barsky, M., et al., "A survey of practical algorithms for suffix tree construction in external memory", Software—Practice and Experience, vol. 40, Issue 11, Oct. 2010, pp. 965-988.*

Aoe, J. "An Efficient Digital Search Algorithm by Using a Double-Array Structure", IEEE Transactions on Software Engineering. vol. 15, 9 (Sep. 1989). pp. 1066-1077.

* cited by examiner

SEARCHABLE, MUTABLE DATA STRUCTURE

CROSS-REFERENCE TO RELATED APPLICATION(S)

This application claims the benefit of U.S. Provisional Application No. 61/753,150, filed on Jan. 16, 2013, which is incorporated by reference.

FIELD OF THE DISCLOSURE

The present disclosure relates to data structures.

BACKGROUND

A trie, or prefix tree, is an ordered tree data structure that can be used to store a dynamic set or associative array in which the keys may be, for example, character strings. In a trie, the position of a particular node defines the key with which it is associated. All descendants of a node have a common prefix of the string associated with that node, and the root is associated with an empty string. A respective value can be associated with specified nodes of interest.

Such data structures can be used in information retrieval applications, for example, to search files and provide results in response to search queries. A trie search can be performed relatively quickly for looking at input character by character. Tries also can be useful for implementing approximate matching algorithms. Furthermore, tries can provide advantages over binary search trees and hash tables for some applications.

SUMMARY

This disclosure describes a trie, which can be particularly advantageous, for example, in applications on resource-constrained computing devices, such as mobile phones, tablets, and other hand-held computing devices.

In one aspect, for example, a data structure includes three arrays. A first array includes a root node, one or more intermediate nodes, and one or more leaf nodes. A second array includes one or more slices, each of which includes one or more elements; a third array also includes one or more elements. Each root node and intermediate node in the first array points to a respective slice in the second array. Each element in the second array stores a byte and has an associated pointer that points either to a respective intermediate node or to a respective leaf node in the first array. Each leaf node in the first array points to a respective element in the third array, and each element in the third array stores a respective sub-string of bytes.

In some implementations, each root node and intermediate node in the first array specifies an offset indicating where in the second array a particular slice pointed to by the root or intermediate node begins and further specifies a length indicating the number of elements in the particular slice. Each slice in the second array can be composed, for example, of a respective number of elements that is a power of two. In some implementations, each sub-string of bytes in the third array is null-terminated and may be followed by a respective constant-size value that points to a respective section of a file. Each section of the file can store, for example, a listing of document identifiers or document pointers for documents that contain a search term that matches a key stored by the trie.

In some implementations, the trie provides a data structure that can be searched, for example, to identify documents that contain a particular search key. The trie also can be searched, in some applications, to provide suggested search keys based on initial characters (i.e., a prefix) of a search term entered by a user. Furthermore, the data structure defined by the trie allows insertions and, in some implementations, can be updated dynamically to incorporate new keys and provide continuous indexing, for example, to additional documents that contain various keys. More generally, the trie can be used with any key value look-up table.

Other aspects, features and advantages will be apparent from the following detailed description, the accompanying drawings and the claims.

DETAILED DESCRIPTION

Figure 1:
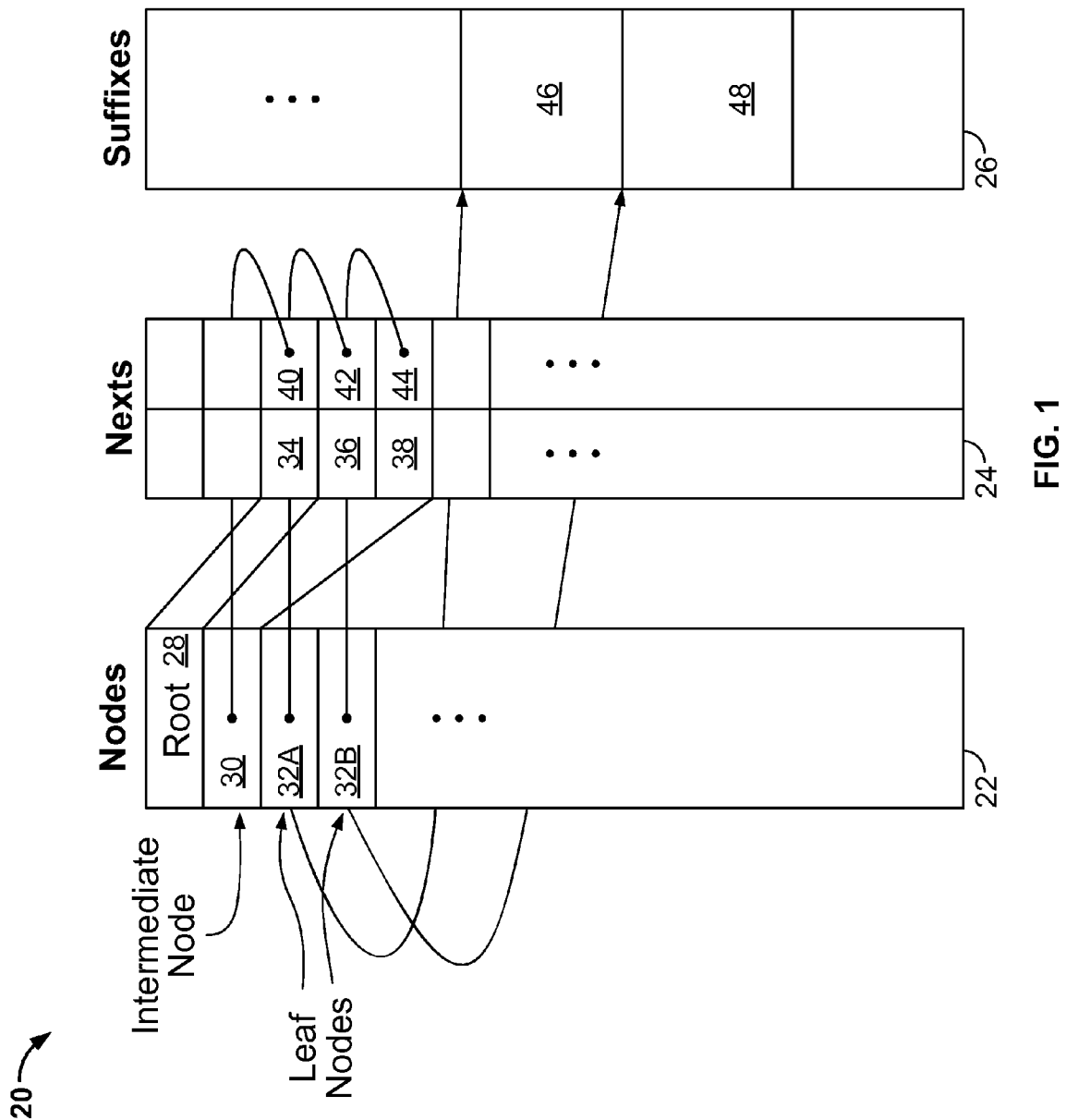
FIG. 1 illustrates an example of a trie.
Figure 2:
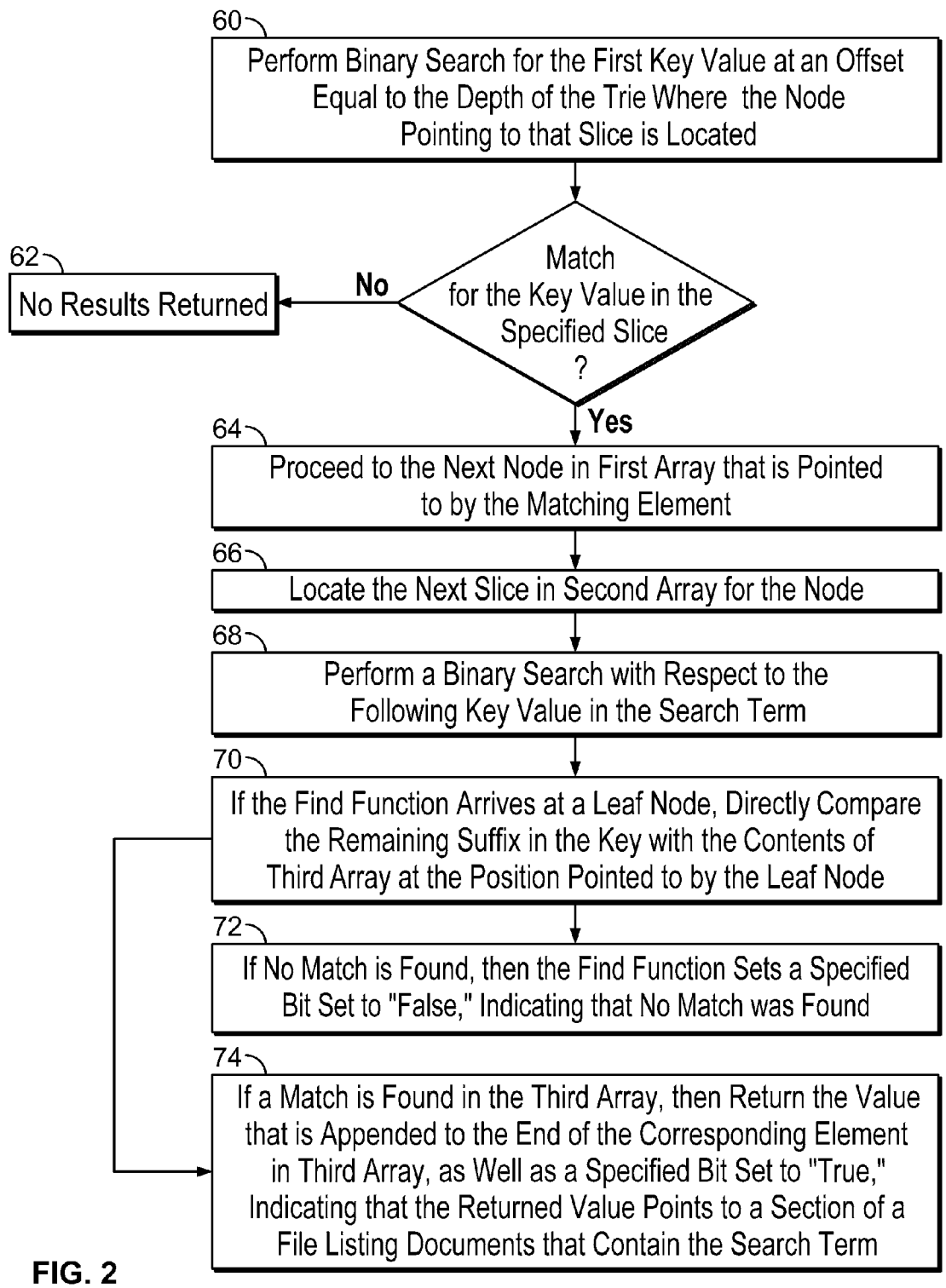
FIG. 2 is a flow chart illustrating an example of a function for searching the trie.

As illustrated in the example of FIG. 1, a trie 20 includes three arrays: a first, or Nodes, array 22; a second, or Nexts array 24, and a third, or Suffixes, array 26. First array 22 contains a root node 28, which is associated with an empty string, as well as one or more intermediate nodes 30 and one or more leaf nodes 32A, 32B. Root node 28 and each intermediate node 30 in first array 22 points to a respective slice in second array 24, where each slice contains one or more elements. In the example of FIG. 1, root node 28 points to a slice that contains a single element 34. In other implementations, root node 28 points to a slice that contains a greater number of elements. For example, in a particular implementation designed for facilitating searches in the English language, root node 28 could point to a slice that contains at least twenty-six elements, one for each character of the English alphabet. The slices in second array 24 can differ in size from one another. However, in some implementations, it is desirable that the number of elements in each slice is a power of two (e.g., 1, 2, 4, 8, 16, 32, ... ). Thus, for example, a slice that needs to include all twenty-six letters of the alphabet would be composed of thirty-two elements, six of which would remain unused. Using slices having a size that is a power of two can help reduce the overall number of bits required and can improve memory allocation.

To facilitate specifying the slice in second array 24 that is pointed to by a particular node in first array 22, each intermediate node 30, as well as root node 28, in first array 22 can contain an (offset, length) pair, where the offset indicates where the slice begins by specifying a distance (e.g., number of elements) from the beginning of second array 24, and the length indicates the number of elements in the particular slice.

In some implementations, each element (e.g., 34, 36, 38) in second array 24 is composed of eight bits, although the number of bits may differ in other implementations. Associated with each element in second array 24 is a corresponding pointer value that points back to either an intermediate node 30 or leaf node 32A, 32B in first array 22. For example, element 34 has an associated pointer value 40 that points back to intermediate node 30 in first array 22. On the other hand, element 36 has an associated pointer value 42 that points back to a first leaf node 32A in first array 22; likewise, element 38 has an associated pointer value 44 that points back to a second leaf node 32B in first array 22. In some implementations, each pointer value (e.g., 40, 42, 44) in second array 24 is composed of twenty-four bits, although the number may differ in other implementations.

Each leaf node 32 in first array 22 points to a respective element in third array 26. For example, leaf node 32A points to element 46 in third array 26, and leaf node 32B points to element 48 in third array 26. Each element (e.g., 46, 48) in third array 26 contains a sub-string of bytes that, in some implementations, is null-terminated (i.e., ends in the value 0). Each sub-string in element (e.g., 46, 48) can be followed by a respective constant-size value that points to a section of a file that contains, for example, a listing of document identifiers or pointers for documents that contain a particular search term that matches the specified key.

Although first array 22 in the example in FIG. 1 shows only a single intermediate node 30 and two leaf nodes 32A, 32B, some implementations will contain many more intermediate and leaf nodes. Also, in some implementations, keys in trie 20 may not include the null byte "\000", which is used as a terminator in suffixes.

To search trie 20 for a specified search term, a "Find" function can be used. The Find function traverses trie 20 and performs binary searches for the key values in the slices in second array 24. Each binary search is performed with respect to a key value in the search term at an offset equal to the depth of the trie 20 where the node pointing to that slice is located (block 60). If the Find function fails to find a match for the key value in the specified slice, then the Find function does not return any result (block 62). On the other hand, if the Find function finds a match in the specified slice of second array 24, it proceeds to the next node in first array 22 that is pointed to by the matching element (block 64), locates the next slice in second array 24 for that node (block 66), and performs a binary search with respect to the following key value in the search term (block 68). If the Find function arrives at a leaf node, it directly compares the remaining suffix in the key with the contents of third array 26 at the position pointed to be the leaf node (block 70). If no match is found, then the Find function sets a specified bit set to "false," indicating that no match was found (block 72). On the other hand, if a match is found in third array 26, then the Find function returns the value (e.g., "value2" or "value1") that is appended to the end of the corresponding element (e.g., 46, 48) in third array 26, as well as a bit set to "true," indicating that the returned value points to a section of a file listing documents that contain the search term (block 74).

Figure 3:
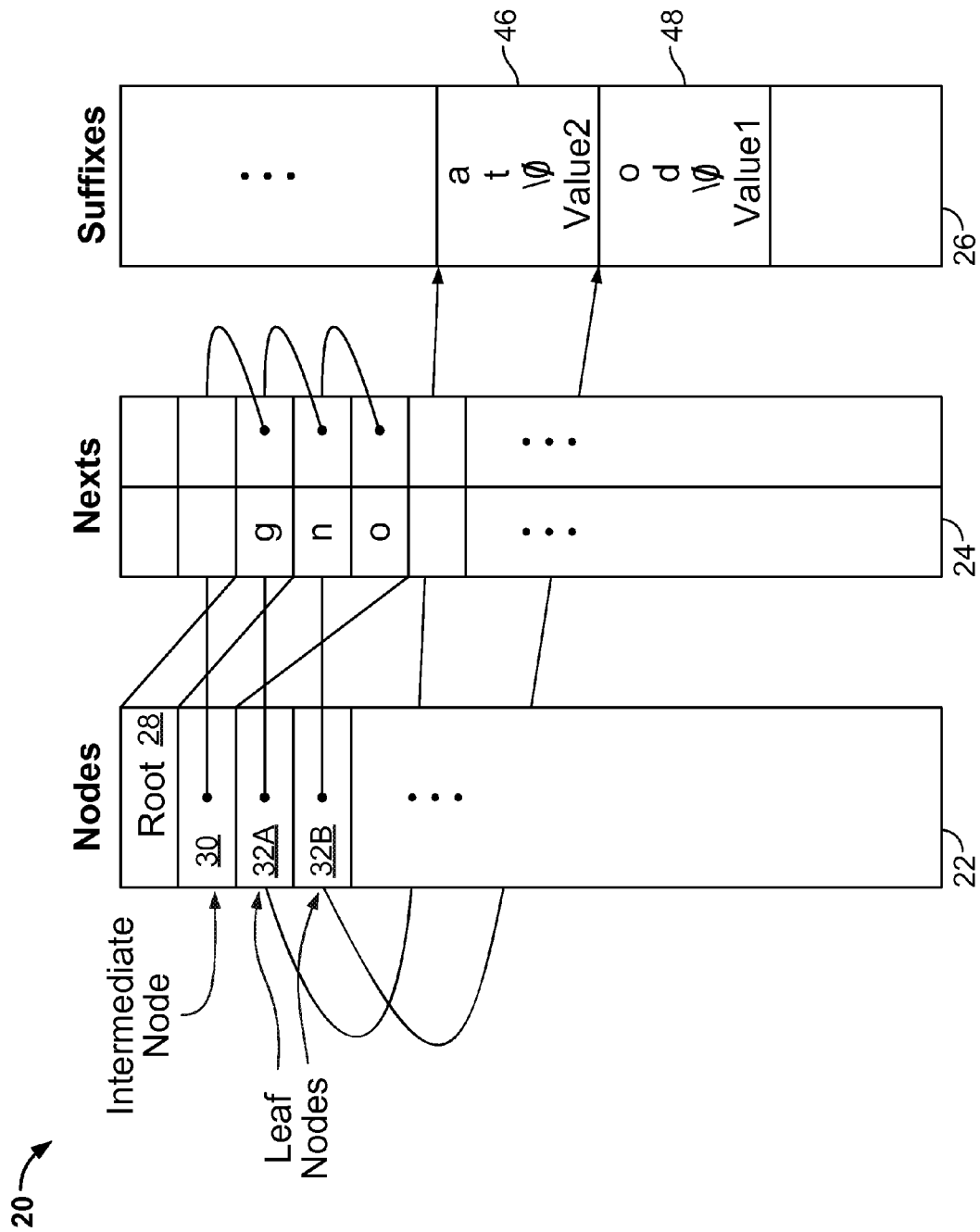
FIG. 3 illustrates an example of a trie populated with particular keys.

Next, a specific example is described explaining how trie 20 can be used to perform a search in response to a query containing a search term. To facilitate the description, it is assumed, as shown in FIG. 3, that root node 28 points to a slice in second array 24 containing the single element "g", and that intermediate node 30 points to a slice in second array 24 that contains two elements, "n" and "o". Furthermore, leaf node 32A points to an element in third array 26 that contains the sub-string "at0" followed by the value "value 2". Likewise, leaf node 32B points to an element in third array 26 that contains the sub-string "od0" followed by the value "value1."

It will be assumed in the example that the search term is "good" and that the Find function uses the trie of FIG. 3 to search for any matches. The Find function starts at root node 28 in first array 22 and scans the element(s) in the slice to which the root node points for a match with respect to the first key value (i.e., "g"). In this case, the slice to which root node 28 points contains a single element whose content ("g") matches the first key value. Therefore, the Find function proceeds to intermediate node 30, which is pointed to by the pointer value associated with the matched element "g". Next, the Find function scans the elements in the slice to which intermediate node 30 points for a match with respect to the second key value (i.e., the first "o" in "good"). In the illustrated example, that slice includes two elements ("n" and "o"), the second of which matches the key value. The Find function then continues to leaf node 32B, which is pointed to by the pointer value associated with the matched element "o". Next, the Find function performs a block comparison between the remaining portion of the key (i.e., the "od" portion of "good") and the sub-string in the element 48 of third array 26 pointed to by leaf node 32B. In this case, there is a match. Thus, the Find function returns the value "value1" that is appended to the sub-string in element 48 and sets a specified bit to "true." Similarly, in the illustrated example of FIG. 3, if the search term were "gnat" (instead of "good"), then the Find function would return the value "value2", which is appended at the end of element 46 in third array 26. On the other hand, if the block comparison does not result in a match, then the Find function simply sets the specified bit to "false." In the illustrated example of FIG. 3, if the search term were "gnat" (instead of "good"), then the Find function would return the value "value2", which is appended at the end of element 46 in third array 26.

Trie 20 can be particularly advantageous, for example, for performing search queries on small, portable computing devices, such as a mobile phone, a tablet or other resource-constrained device. For example, if a user of a mobile phone wishes to search a particular e-mail folder for messages containing a search term specified by the user, trie 20 can be stored in the mobile device, and the Find function can be executed on the mobile device in response to the user's entering the search or query. If a match is found by the Find function, the returned value (e.g., "value1" or "value2") would point to a section of a file containing a posting list of the documents (e.g., e-mail messages) that contain the search term. More generally, trie 20 can be used in connection with any key value look-up table and is not limited to use with small, portable computing devices.

In some implementations, trie 20 is mutable such that the data structure can be updated to include additional keys. For example, the trie structure can be updated to include new keys (e.g., words) that are present, for example, in e-mail messages recently-received on a mobile phone, but that are not yet included in trie 20. To update trie 20, an Insertion function can be called, as described in greater detail below in connection with FIG. 4. The Insertion function can be used to add new keys to trie 20 by adding additional nodes and elements to each of arrays 22, 24, 26 as needed. Nodes need not, however, be removed during the insertion process. An Allocation function for assigning sections of the arrays can manage and track assignments in the arrays. Allocations can be tracked by maintaining a current size for the nodes array.

In some implementations, the Allocation function manages assignment of space in second array 24 using free lists. Preferably, each available hole in array 24 for holding a slice is allocated at power-of-2 boundaries. If all elements in a particular slice of second array 24 are filled and one or more elements need to be added to the slice, the slice may need to be moved to another location in array 24. For example, if a slice needs a length of three to accommodate three elements, a space of four (i.e., $2^2$) is allocated for the slice. The slice can grow until it reaches its hole size (i.e., four). Then, if additional space is needed for the slice, it is moved to the next power-of-2 boundary, in this case eight (i.e., $2^3$). When a hole remains in array 24 because a slice was moved to a larger hole, the previous hole can be added to a free list, which can be made available for future use. In some implementations, there is a separate free list for each allocation size (e.g., for each slice size of a particular power of 2). If no holes of a given size are available for a slice, a new hole is allocated from the end of the array.

Figure 4:
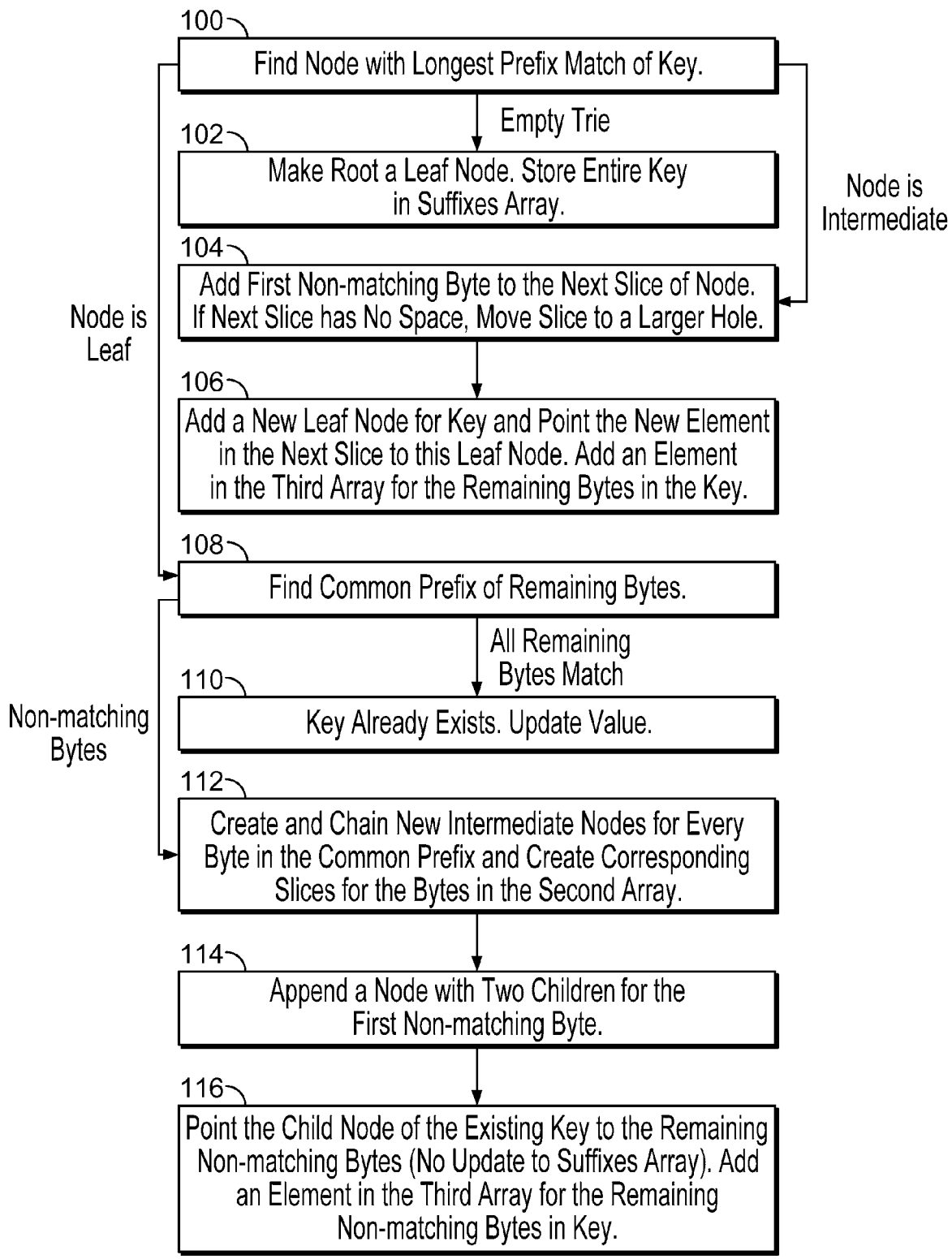
FIG. 4 is a flow chart illustrating an example of a function to facilitate insertion of a key into the trie.

As indicated by FIG. 4, initially, the Insertion Function searches trie 20 and identifies the node in first array 22 that has the longest prefix that matches the key (block 100). For example, if the new key is the word "gist," then (with respect to trie 20 of FIG. 3), the node that has the longest matching prefix might be intermediate node 30 (where the matching prefix is "g"). On the other hand, if the new key is the word "gone," the node that has the longest matching prefix might be leaf node 32B (where the matching prefix is "go").

During execution of the Insertion function, in the event that trie 20 is empty (i.e., the new key is to be the first entry in trie 20), the Insertion function assigns root node 28 as a leaf node and stores the entire key as an element in third array 26 (block 102).

Assuming, on the other hand, that the Insertion function identifies the node in array 22 with the longest prefix that at least partially matches the new key, the next steps performed by the Insertion function depend on whether the identified node is an intermediate node (e.g., node 30) or a leaf node (e.g., node 32A or 32B). If the identified node is an intermediate node (e.g., node 30), then the first non-matching byte in the key is added to as a new element to the slice in second array 24 pointed to by the intermediate node (block 104). For example, with respect to trie 20 of FIG. 3, if the new key is the word "gist," then the first non-matching byte (i.e., the letter "i") would be added as a new element to the slice in array 24 pointed to by intermediate node 30. See FIG. 5, in which it is assumed that the slice in second array 24 pointed to by intermediate node 30 includes four elements.

If the slice in second array 24 pointed to by the intermediate node already is full, such that there is no room to add another element (e.g., the letter "i"), then the entire contents of the slice (including the contents of the previous elements (i.e., "n" and "o" in FIG. 3) as well as the non-matching byte byte ("i")) are moved to a larger hole in second array 24. For example, if the slice in second array 24 pointed to by intermediate node 30 contains only two elements, both of which already have bytes stored in them, then the entire contents of the slice would be moved to an available area of second array 24 (e.g., a hole having a size for four elements), and the non-matching byte (i.e., the letter "i" in the example) would be added to the new slice. Intermediate node 30 would then point to the new slice, and the section of second array 24 that previously corresponded to the slice pointed to by intermediate node 30 would be available for future use. In some implementations, the elements in a particular slice are sorted such that they appear, for example, in alphabetical order.

Figure 5:
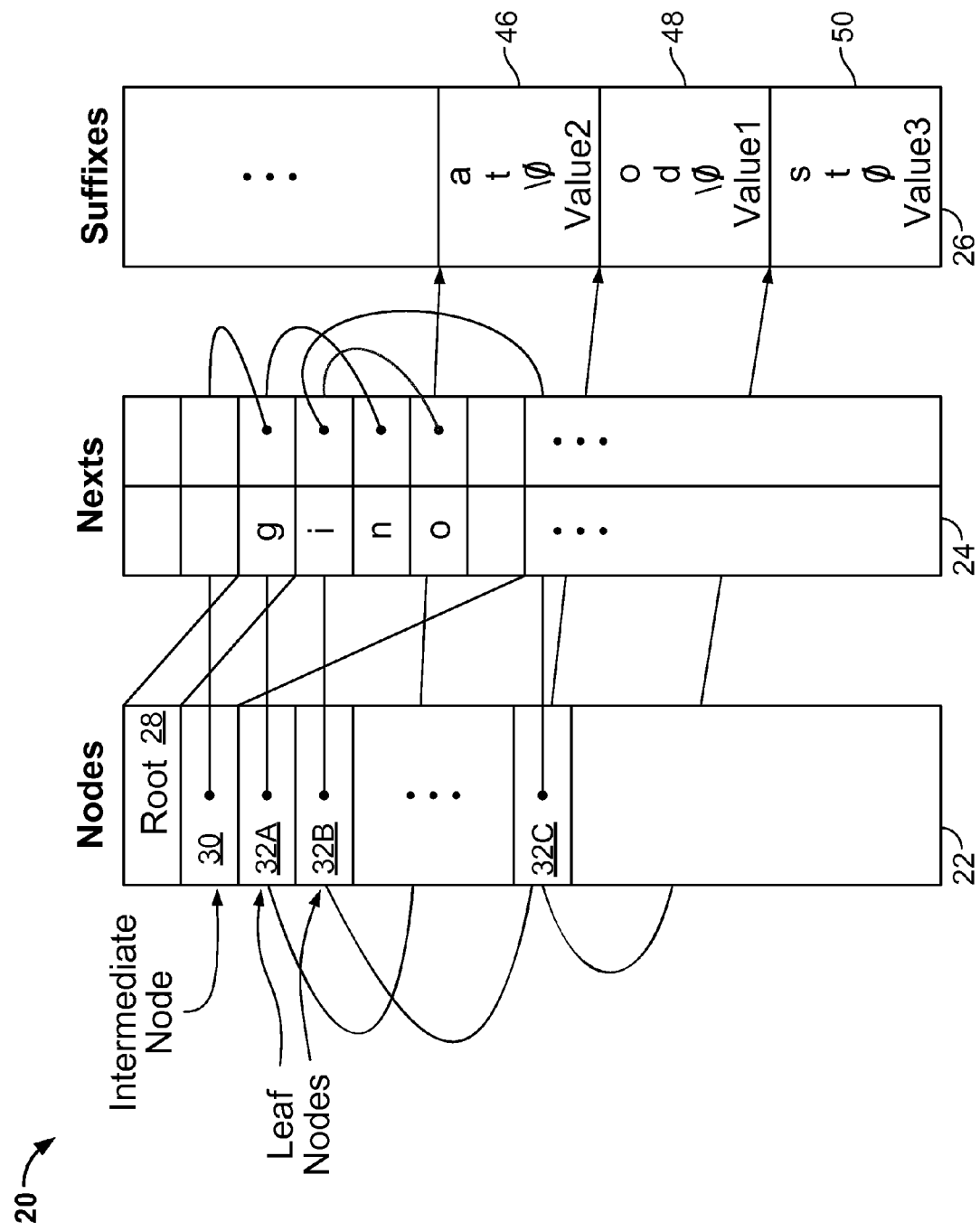
FIGS. 5, 6, 7 and 8 illustrate an example of inserting a new key into the trie.

Once the non-matching byte (i.e., the letter "i" in the example) is added to the appropriate slice in second array 24, a new leaf node 32C is added to first array 22 (see FIG. 5 and block 106 in FIG. 4). The new element (i.e., the letter "i" in the example) added to the slice in second array 24 points to newly added leaf node 32C in first array 22, and newly added leaf node 32C points to a new element 50 in third array 26, where the contents of new element 50 include a sub-string that corresponds to the remaining non-matching bytes of the key. Assuming, as in the foregoing example, that the new key is the word "gist," then the null-terminated sub-string "st0" would be included in newly added element 50, which is pointed to by leaf node 32C. See FIG. 5.

The foregoing operations of the Insertion function allow trie 20 to be updated in a situation where the node with the longest prefix matching the key is an intermediate node. On the other hand, if the node with the longest prefix matching the key is a leaf node (e.g., node 32A or 32B), then the Insertion function searches trie 20 to determine whether or not there exists a common prefix for some or all of the remaining bytes of the key (block 108). For example, if the key were the word "good," then the Insertion function would determine (in block 100) that leaf node 32B is the node with the longest prefix (i.e., "go") that matches the key, and (in block 108) that the remaining bytes (i.e., "od") match the contents of element 48 in third array 26 pointed to by leaf node 32B. In that situation, the Insertion function would determine that the key (i.e., "good") already exists in trie 20. To reflect that an additional document (e.g., a newly received e-mail message) contains the key, the Insertion function would update the value appended at the end of element 48 corresponding to that key (block 110).

Figure 6:
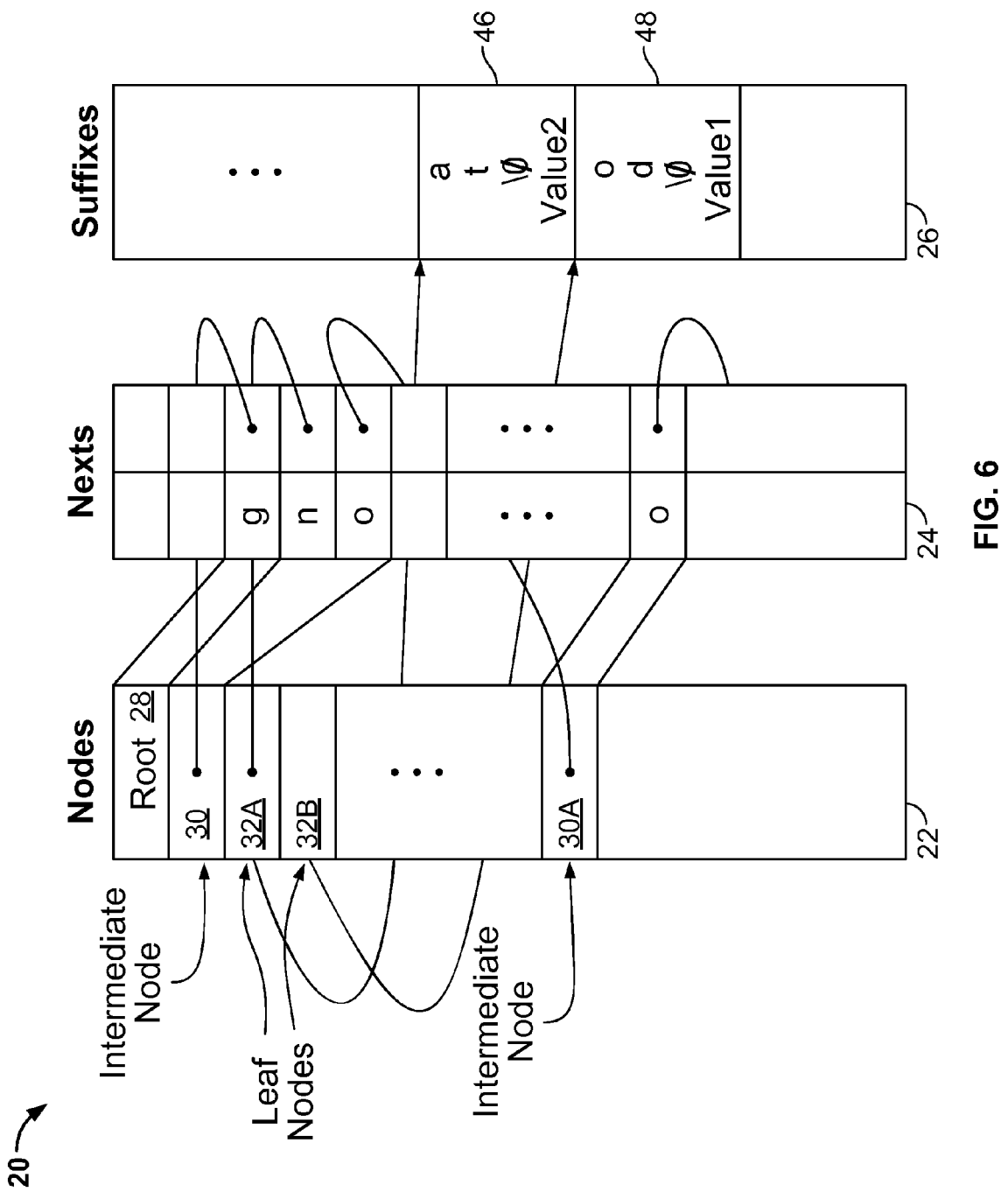

If, as a result of performing the operations of block 108, the Insertion function determines that there are one or more non-matching bytes in the key, then new intermediate nodes are created and linked for each byte in the common prefix (block 112). For example, if the new key is the word "goose," then the Insertion function would determine (in block 100) that leaf node 32B is the node with the longest prefix (i.e., "go") that matches the key. The Insertion function also would determine (in block 108) that the there is one additional subsequent matching byte (i.e., the second "o" in "goose" matches the "o" in element 48 pointed to by leaf node 32B), but that there is no match for the other remaining bytes in the key ("se" in "goose"). Thus, in block 112, the Insertion function would create a new intermediate node 30A in first array 22 (see FIG. 6). New intermediate node 30A points to a slice of size one in second array 24. The contents of the element in the new slice would correspond to the byte in the common prefix (i.e., the letter "o" in the foregoing example). In addition, the pointer value associated with the element "o" in the slice of second array 24, which is pointed to by intermediate node 30, would be changed to point to the newly created intermediate node 30A. See FIG. 6.

Figure 7:
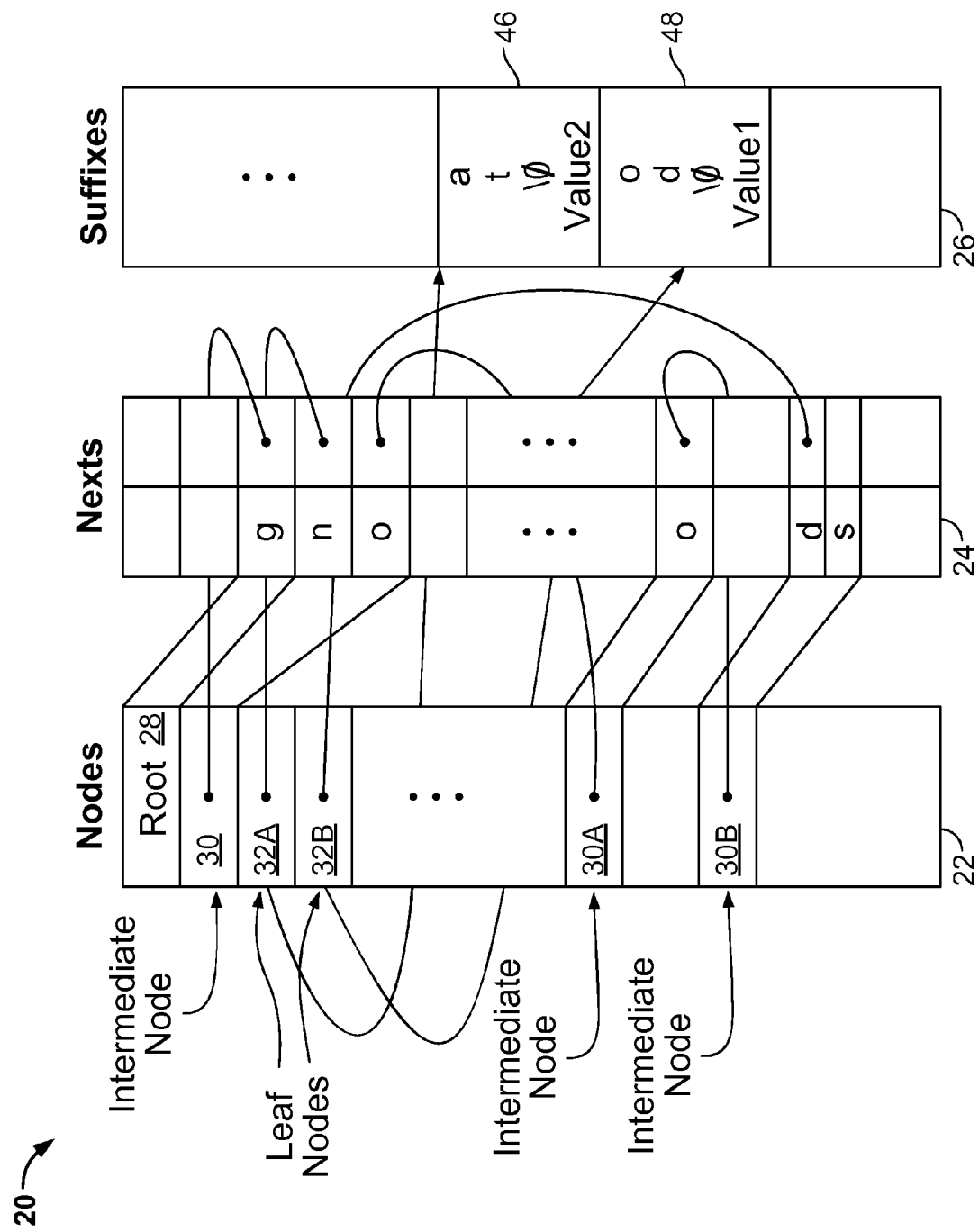
Figure 8:
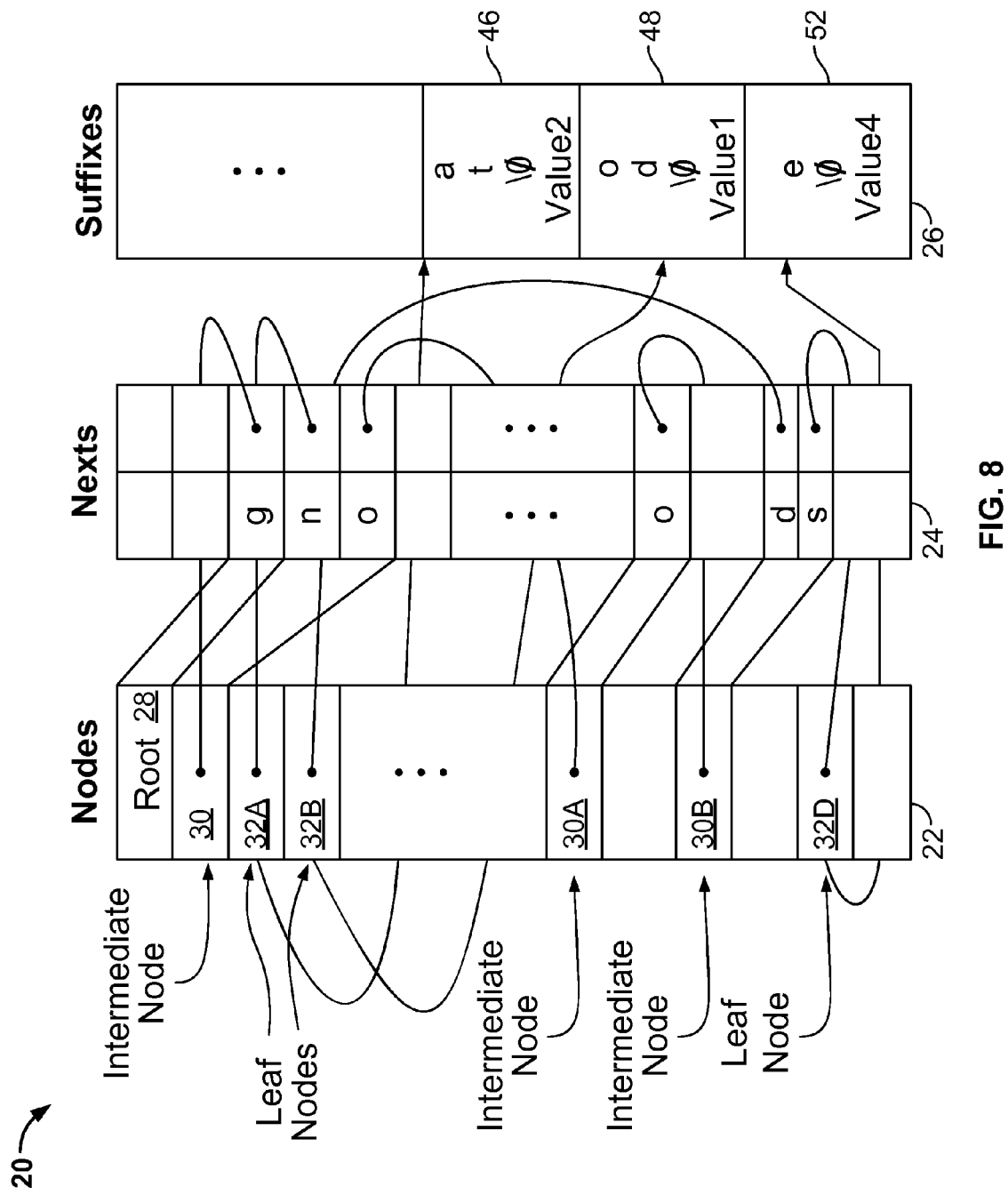
Figure 9:
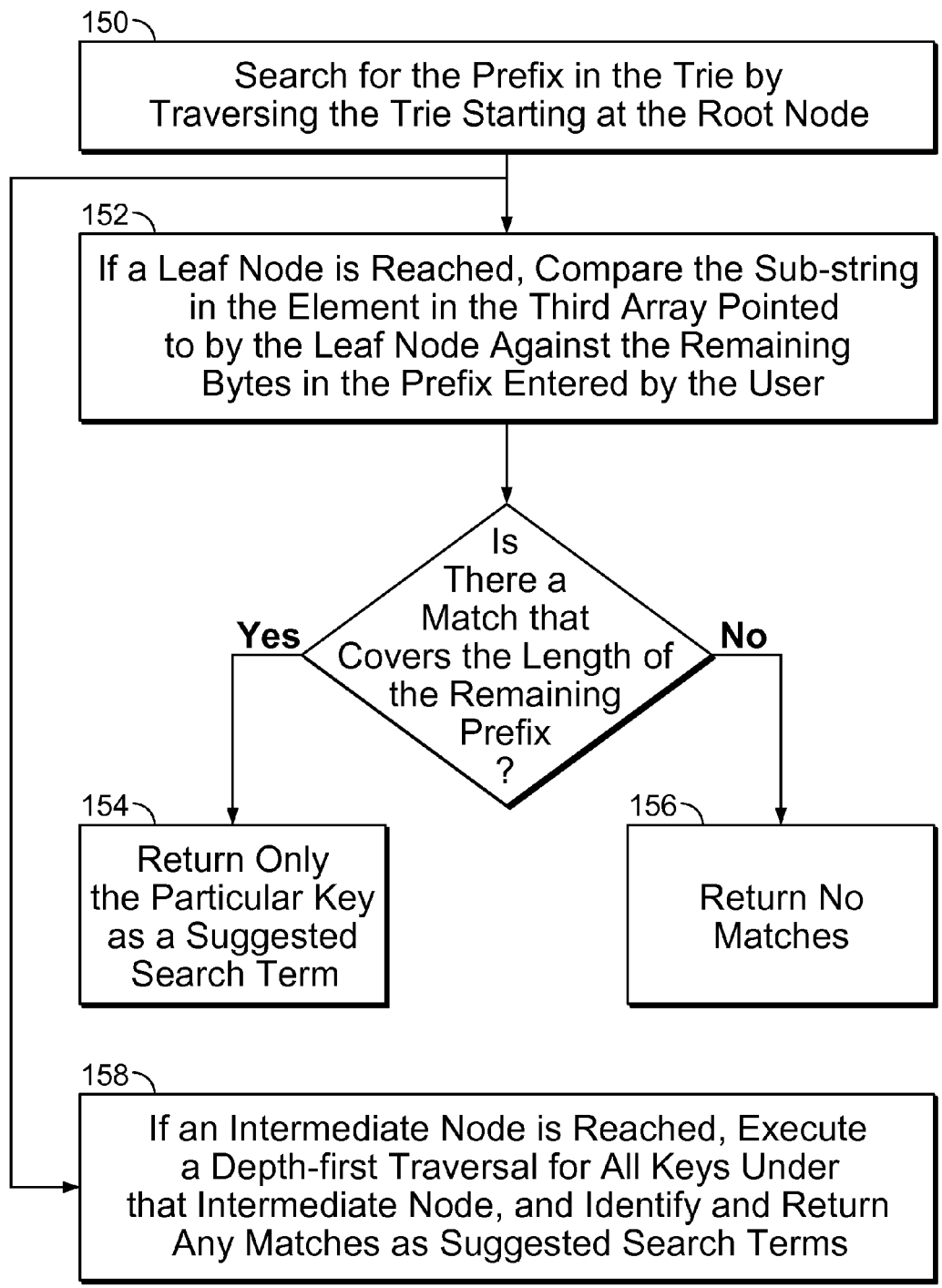
FIG. 9 is a flow chart illustrating an example of a function for providing suggestions of search terms based on the trie and based on a user-entered prefix.

Next, as shown in FIG. 7, the Insertion function adds another intermediate node 30B in first array 22, (block 114). The newly added intermediate node 30B is pointed to by the element in second array 24 that contains the last byte of the common prefix (i.e., the "o" in the slice pointed to by intermediate node 30A). The newly added intermediate node 30B points to a slice of size two in second array 24. Each element in this slice contains a corresponding one of the first non-matching bytes (e.g., "d" for the existing key "good," and "s" for the new key "goose"). The pointer value for the first non-matching byte of the existing key (i.e., the pointer value for the "d" in "good") points to leaf node 32B, which points to any remaining non-matching bytes in element 48 of third array 26. In this example, since all the bytes of the existing key ("good") have been accounted for, leaf node 32B for the existing key will point to the null character (0) at the end of the sub-string in element 48. Finally, as indicated by block 116, a new leaf node 32B is added to first array 22 and is pointed to by the pointer value associated with the first non-matching byte ("s" in the example) for the new key ("goose") (see FIG. 8). Newly added leaf node 32D points to a newly added element 52 in third array 26. The contents of element 52 are the remaining non-matching byte(s) for the new key (i.e., the last letter of the word "goose"), followed by the null character (0), and a constant-size value that points, for example, to a section of a file that contains a listing of documents that contain the specified key see FIG. 8).

The first, second and third arrays 22, 24, 26 of trie 20 can be stored serially, for example, on disk, such as flash memory. The allocation strategy can cooperate well with natural language keys. For example, it can result in low internal and external fragmentation of disk space. In some implementations for an English-language dictionary, the allocation strategy can achieve internal fragmentation on the order of about 12% and external fragmentation on the order of about 0.003%. Trie 20 also can be implemented compactly on disk and/or memory.

Trie 20 also can be used to identify suggestions that match the initial bytes of a search term. Thus, if a user of a mobile phone or other computing device begins to enter a search term, a Prefix function can be called. The Prefix function returns one or more suggested keys that may correspond to the prefix entered by the user. For example, if the user enters "sp" as the initial characters of the search query, the Prefix function might return the suggested keys "sports," "spring" and "spy" based on keys already available in trie 20. The returned suggestions can be displayed on a display screen of the mobile phone or other computing device. If one of the suggested keys corresponds to the search term the user wishes to use, the user can select the desired choice. In response, the mobile phone or other computing device will call the Find function and use the selected search term without the user having to enter the remaining characters of the search term.

To identify all possible keys that match a particular prefix, the Prefix function attempts to find the prefix in trie 20 by traversing the trie starting at the root node (block 150). If the Prefix function reaches a leaf node (e.g., leaf node 32A or 32B in FIG. 1), it then compares the sub-string in the element in third array pointed to by the leaf node against the remaining bytes in the prefix entered by the user (block 152). If there is a match that covers the length of the remaining prefix, then the Prefix function returns only the particular key (block 154). Otherwise, the Prefix function returns no matches (block 156). If the Prefix function reaches an intermediate node, it executes a depth-first traversal for all keys under that intermediate node and identifies and returns any matches as suggested search terms (block 158). The depth-first traversal explores the first child of a node before visiting its siblings.

Trie 20 thus provides a data structure that can be searched, for example, using the Find function to identify documents that contain a particular search key, and can be searched, for example, using the Prefix function, to provide suggested search keys based on initial characters of a query entered by a user. Furthermore, trie 20 is mutable (i.e., allows insertions) and, in some implementations, can be updated dynamically to incorporate new keys and provide continuous indexing to additional documents. More generally, trie 20 can be used with any key value look-up table.

Figure 10:
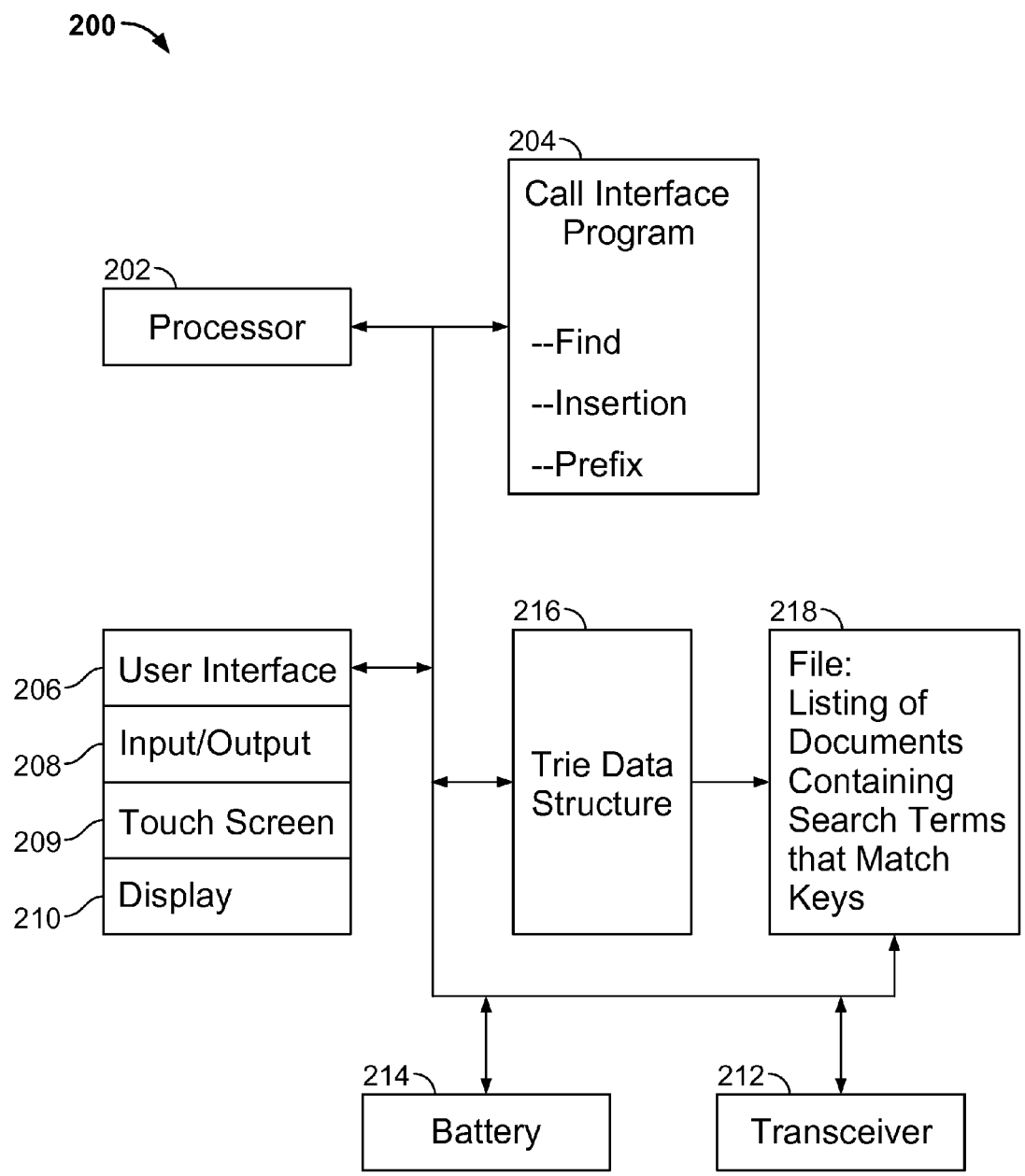
FIG. 10 is a block diagram of an example of a mobile computing device that includes the trie.

In view of the compact nature of trie 20, it can be particularly advantageous for implementations on resource-constrained computing devices, such as mobile phones, tablets, and other hand-held computing devices. As an example, FIG. 10 illustrates various components of a mobile phone 200 that includes a processor 202 that can execute a caller interface program stored, for example, in memory (e.g., RAM) 204, a user input/output interface 206 (which may include, for example, input/output keys 208, a touch screen 209 and a display 210), a transceiver 212 and a battery 214. Mobile phone 200 also includes disk (e.g., flash memory) 216 storing a trie data structure as described above and may include other components as well. The various components can be interconnected using various buses, and several of the components may be mounted on a common motherboard or in other manners as appropriate. A user can enter search queries into the mobile phone 200 through user interface 206. The caller interface program stored in RAM 204 can include one or more of the Find function, the Insertion function and the Prefix function described above. Thus, as the user enters initial characters of a search term in a navigation or search area, the Prefix function can provide suggested search terms. Similarly, when the user completes entering the search term or selects a suggested search term, the Find function can identify documents containing the particular search term, and the list of documents can be displayed for the user. The list of documents containing specified keys can be stored in a file 218 on the mobile phone. As new e-mail messages (or other documents) are received by mobile phone 200, the Insertion function can automatically update trie 20 to the keys contained in those documents Storing trie 20 in disk 216 can facilitate providing persistent data in the event of a program crash or a power failure (e.g., removal of battery 214 from the mobile phone). Furthermore, when required, the contents of trie 20 can be loaded quickly into RAM 204.

Various aspects of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone or other computing device. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the invention. Accordingly, other implementations are within the scope of the claims.

What is claimed is:

1. A computing device comprising:
a first memory portion storing instructions;
a processor operable to execute the instructions stored in the memory;
a display;
a user interface allowing a user to enter a search key;
a second memory portion storing a searchable data structure comprising:
a first array including a root node, one or more intermediate nodes, and one or more leaf nodes;
a second array including one or more slices, each of which includes one or more elements;
a third array including one or more elements,
wherein each root node and each intermediate node in the first array points to a respective slice in the second array,
each element in the second array that stores a byte has an associated pointer that points either to a respective intermediate node or to a respective leaf node in the first array,
each leaf node in the first array points to a respective element in the third array, and
each element in the third array stores a respective substring of bytes and a respective value that points to a respective section of a file,
wherein the instructions cause the processor to search the data structure for a match in response to a user entering the search key and wherein, if a match is found in the data structure for the search key, the value contained in the element of the third array that matches a suffix of the search key is returned, and a list of documents containing the search key is displayed on the display.

2. The computing device of claim 1 wherein the instructions executed by the processor cause the processor to traverse the data structure, starting at the root node, in search of a match to the search key.

3. The computing device of claim 2 wherein the instructions executed by the processor cause the processor to perform a binary search when searching for a key value in a slice in the second array.

4. The computing device of claim 3 wherein the instructions executed by the processor cause the processor to compare a remaining suffix of the key with contents of the third array at a position pointed to by one of the leaf nodes.

5. The computing device of claim 1 wherein each root node and each intermediate node in the first array specifies (i) an offset indicating where in the second array a particular slice pointed to by the root or intermediate node begins and (ii) a length indicating the number of elements in the particular slice.

6. The computing device of claim 1 wherein each slice in the second array is composed of a respective number of elements that is a power of two.

7. The computing device of claim 1 wherein each substring of bytes in the third array is null-terminated.

8. A computing device comprising:
a first memory portion storing instructions;
a processor operable to execute the instructions stored in the memory;
a display;
a user interface allowing a user to enter a search key;
a second memory portion storing a searchable data structure comprising:
a first array including a root node, one or more intermediate nodes, and one or more leaf nodes;
a second array including one or more slices, each of which includes one or more elements;
a third array including one or more elements,
wherein each root node and each intermediate node in the first array points to a respective slice in the second array, each element in the second array that stores a byte has an associated pointer that points either to a respective intermediate node or to a respective leaf node in the first array, each leaf node in the first array points to a respective element in the third array, and each element in the third array stores a respective sub-string of bytes and a respective value that points to a respective section of a file, wherein the instructions cause the processor to search the data structure for one or more possible matches in response to a user entering a first part of the search key, wherein possible matches identified by the processor are displayed on the display as suggested search terms.

9. The computing device of claim 8 wherein the processor searches the data structure for the first part of the search key by traversing the data structure starting at the root node.

10. The computing device of claim 9 wherein, if a leaf node is reached by the processor while traversing the data structure, the processor compares the sub-string in the element in the third array pointed to by the leaf node with remaining bytes in the first part of the search key entered by the user.

11. The computing device of claim 10 wherein, if the comparison by the processor identifies a match, the processor displays as a suggested search term only a key corresponding to the element in the third array pointed to by the leaf node.

12. The computing device of claim 9 wherein, if an intermediate node is reached by the processor while traversing the data structure, the processor executes a depth-first traversal for all keys under the intermediate node and displays on the display any matches as suggested search terms.

13. The computing device of claim 8 wherein each root node and each intermediate node in the first array specifies (i) an offset indicating where in the second array a particular slice pointed to by the root or intermediate node begins and (ii) a length indicating the number of elements in the particular slice.

14. The computing device of claim 8 wherein each slice in the second array is composed of a respective number of elements that is a power of two.

15. The computing device of claim 8 wherein each sub-string of bytes in the third array is null-terminated.

16. A computing device comprising:
a file storing listings of documents that contain respective keys;
a first memory portion storing instructions;
a processor operable to execute the instructions stored in the memory;
a display;
a user interface allowing a user to enter a search key;
a second memory portion storing a searchable data structure comprising:
a first array including a root node, one or more intermediate nodes, and one or more leaf nodes;
a second array including one or more slices, each of which includes one or more elements;
a third array including one or more elements,
wherein each root node and each intermediate node in the first array points to a respective slice in the second array,
each element in the second array that stores a byte has an associated pointer that points either to a respective intermediate node or to a respective leaf node in the first array, each leaf node in the first array points to a respective element in the third array, and each element in the third array stores a respective sub-string of bytes and a respective value that points to a respective section of the file, wherein the instructions cause the processor to update the data structure when a key from an additional document is reflected in the file, and wherein the processor searches the data structure for the key from the additional document and, if the key already is present in the data structure, the processor updates the respective value that points to a corresponding section of the file.

17. The computing device of claim 16 wherein the processor identifies a node in the first array with a longest prefix that at least partially matches the key from the additional document and, if the identified node is an intermediate node, the instructions cause the processor to perform the following operations:
adding a first non-matching byte in the key from the additional document as a new element to a slice in the second array pointed to by the intermediate node, and
adding a new leaf node to the first array,
wherein the new element added to the slice in the second array points to the new leaf node in the first array,
the new leaf node points to a new element in the third array, and
contents of the new element include a sub-string that corresponds to remaining non-matching bytes of the key from the additional document.

18. The computing device of claim 16 wherein the processor identifies a node in the first array with a longest prefix that at least partially matches the key from the additional document and, if the identified node is a leaf node, then the instructions cause the processor to perform the following operations:
creating and linking a respective new intermediate node for each byte in a prefix that is common to an existing key in the data structure and the key from the additional document, and
creating a corresponding slice in the second array for each byte in the common prefix.

19. The computing device of claim 18 wherein the instructions cause the processor to further perform the following operation:
adding an intermediate node pointing to a slice in the second array comprising a first element that corresponds to a first non-matching byte of the existing key, and a second element that corresponds to a first non-matching byte of the key from the additional document.

20. The computing device of claim 18 wherein the instructions cause the processor to further perform the following operations:
pointing the first element, via a leaf node, to any remaining non-matching bytes of the existing key in the third array;
adding a new element to the third array, wherein the new element includes any remaining non-matching bytes of the key from the additional document; and
pointing the second element to the new element via a new leaf node in the first array.

* * * * *